Patented Apr. 6, 1943

2,316,051

UNITED STATES PATENT OFFICE 2,316,051

ANTISPASMODIC AGENTS

John W. Cusic, Chicago, and Robert R. Burtner, Skokie, Ill., assignors to G. D. Searle & Co., Chicago, Ill., a corporation of Illinois No Drawing. Application December 31, 1941, Serial No. 425,178

4 Claims. (Cl. 260—469)

This invention relates to a new group of antispasmodic agents, namely, the aminoalcohol esters of 9, 10-dihydroanthracene-9-carboxylic acid. These amino esters, in the form of their salts, have been found by us to be extraordinarily efficient in relieving spasms of smooth muscle of the sort that are caused by histamine or similar substances. Not only are these esters powerful antispasmodic agents, but we have also found them to be relatively nontoxic, resulting in their having a relatively high therapeutic index. (Therapeutic index is defined as the ratio of the average killing dose to the average therapeutic dose, and is thus a measure of the margin of safety afforded in the practical use of a drug.) Consequently, the compounds described and claimed herein may be administered safely and without annoying side effects to both test animals and human beings. For example, the β-diethylaminoethyl ester of 9, 10-dihydroanthracene-9-carboxylic acid has been administered (as the hydrochloride salt) in doses of fifteen-hundredths (0.15) gram repeated four times daily to human patients, resulting in marked relief from the spasmodic symptoms for which it was administered, and with no toxic or other ill results.

The compounds which form the subject of this invention may be represented by the formula

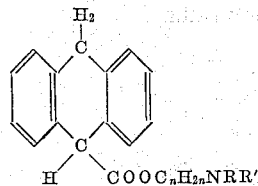

wherein $n$ stands for the integer 2 or 3 (the invention contemplating a branched as well as straight chain in the latter case) and wherein R stands for hydrogen or a saturated alkyl group containing not more than four carbon atoms and wherein R' stands for a saturated alkyl group containing not more than four carbon atoms. These compounds may be prepared from the dihydroanthracenecarboxylic acid and the appropriate amino alcohol by conventional methods of esterification of such bodies, such as, for instance, conversion of the acid to the acid chloride and treatment with the amino alcohol in an inert solvent, or by refluxing the acid with appropriate aminoalkyl halide in a solvent such as isopropanol. The following examples are typical of the preparation of the whole series of compounds.

*Example I.*—Twenty-two and one-half (22.5) grams of 9, 10-dihydroanthracene-9-carboxylic acid are converted to the acid chloride by refluxing with excess thionyl chloride. The excess reagent is removed in a vacuum, and the residual crude acid chloride treated with a solution of 11.7 grams of β-diethylaminoethanol in about fifty cubic centimeters of benzene. This mixture is refluxed for about an hour and, after cooling, poured into dilute aqueous alkali. The aminoester is extracted with ether, and the oily base obtained after removal of the ether is redissolved in ten volumes of dry ether. This solution is treated with one equivalent of alcoholic hydrogen chloride, and the precipitate recrystallized from isopropanol. The hydrochloride of the β-diethylaminoethyl ester of 9, 10-dihydroanthracene-9-carboxylic acid thus obtained melts at 169° centigrade.

*Example II.*—Forty-four (44) grams of gamma-diethylaminopropyl chloride are added to a hot solution of 65 grams of 9, 10-dihydroanthracene-9-carboxylic acid in three hundred (300) cubic centimeters of isopropanol. The solution is refluxed for two hours, after which the solvent is removed by vacuum distillation. The crude hydrochloride of the gamma-diethylaminopropyl ester of 9, 10-dihydroanthracene-9-carboxylic acid is dissolved in water and the free base liberated by addition of alkali. The basic ester is extracted with ether and converted to the purified hydrochloride exactly as described in Example I. The salt thus obtained melted at 135° C.

Working in a manner exactly analogous to either of the above examples, we have prepared and caused to be tested the following representative aminoalcohol esters of 9, 10-dihydroanthracene-9-carboxylic acid, viz: β-dimethylaminoethyl, β-diethylaminopropyl, β-monisobutylaminoethyl, and β-di-n-butylamino-ethyl. These compounds all exist as the free base as water-insoluble oils, and form crystalline salts with hydrochloric and other acids. They are further characterized by the high degree of antispasmodic activity against spasms of the type caused by histamine, as mentioned earlier in this specification.

The tests whereby these antispasmodic properties were demonstrated were carried out on smooth muscle strips by measuring the ability of the compounds described herein to counteract spasms of the muscle strips caused by typical drugs. Against spasms caused by acetylcholine, a moderate relaxation of the spasm is caused by typical compounds of our invention. Since acetylcholine is known to act through a nervous mechanism, this demonstrates a moderate neurotropic effect of these compounds. Against spasms caused by histamine, however, the compounds of our invention exert a remarkably potent relaxing effect, far greater than that of any other synthetic antispasmodic agent of which we are aware. Their potency varies among individual members of the series, ranging from several times, to approximately twenty times that of the naturally occurring drug, papaverine, which has found extensive use in the practice of medicine. Since histamine is known to act directly upon muscular tissue, this demonstrates a remarkable musculotropic effect of these drugs.

In addition to the above-described spasmolytic properties, these new compounds also manifest activity as local anesthetics. Tested according to the standard technique on a rabbit's cornea, a one per cent solution of representative compounds produced full, deep anesthesia for periods of time varying among individual compounds in the series, and ranging up to well over one-half hour.

By virtue of the amino nitrogen atom common to all the esters of this invention, they are all basic substances and form stable salts with acids. These salts are in general readily soluble in water, whereas the free esters are quite insoluble in water. For this reason, it is convenient to use these esters in the form of a salt, frequently the hydrochloride, both for pharmacological testing and for clinical administration. Inasmuch as it is the basic ester (and not the acidic portion of the salt molecule) that is the active principle, the nature of this acid employed is merely a matter of convenience. The acid portion of such salt may be varied widely, the only limitation being that the anion of the acid must be reasonably non-toxic. It will be understood that the esters referred to in this specification and the claims appended thereto may be, and preferably are, used in the form of a salt.

These new compounds may be used for therapy by any desired route of administration. The soluble salts may be prepared in dilute or concentrated solution for injection, or they may be prepared as tablets for oral administration. Oral administration appears to be preferable by reason of its simplicity, in view of the fact that the full effect of the medication is manifested when thus administered.

It will be understood that the invention herein described is not limited except as defined by the appended claims.

We claim:

1. New compounds, useful in therapeutics, consisting of the basic esters of 9, 10-dihydroanthracene-9-carboxylic acid, represented by the formula

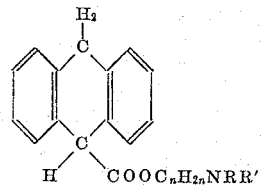

wherein $n$ is chosen from the integers 2 and 3, R is one of the group consisting of a hydrogen atom and saturated alkyl groups containing not more than four carbon atoms; and R' is an alkyl group containing not more than four carbon atoms.

2. New compounds, useful in therapeutics, consisting of the basic esters of 9, 10-dihydroanthracene-9-carboxylic acid, represented by the formula

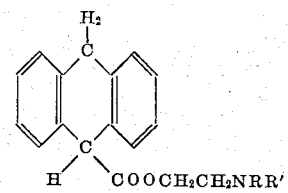

wherein R is one of the group consisting of a hydrogen atom and saturated alkyl groups containing not more than four carbon atoms; and R' is an alkyl group containing not more than four carbon atoms.

3. New compounds, useful in therapeutics, consisting of the basic esters of 9, 10-dihydroanthracene-9-carboxylic acid, represented by the formula

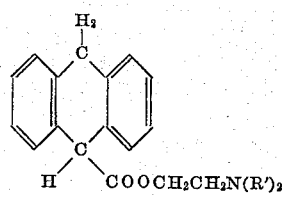

wherein R' is an alkyl group containing not more than four carbon atoms.

4. A new compound, useful in therapeutics, consisting of the diethylaminoethyl ester of 9, 10-dihydroanthracene-9-carboxylic acid, represented by the formula

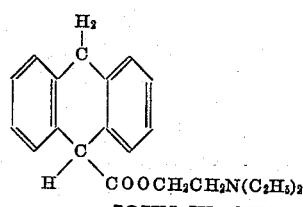

JOHN W. CUSIC.
ROBERT R. BURTNER.